United States Patent
Ranson et al.

(10) Patent No.: US 9,929,980 B2
(45) Date of Patent: Mar. 27, 2018

(54) LINK-FAULT TOLERANCE IN A DISTRIBUTED ANTENNA SYSTEM

(71) Applicant: CommScope Technologies LLC, Hickory, NC (US)

(72) Inventors: Christopher G. Ranson, Concord, VA (US); Mathias A. Schmalisch, Lynchburg, VA (US); Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 329 days.

(21) Appl. No.: 14/621,157

(22) Filed: Feb. 12, 2015

(65) Prior Publication Data
US 2015/0319109 A1 Nov. 5, 2015

Related U.S. Application Data

(60) Provisional application No. 61/987,869, filed on May 2, 2014.

(51) Int. Cl.
*H04L 12/939* (2013.01)
*H04L 27/26* (2006.01)
(Continued)

(52) U.S. Cl.
CPC ............ *H04L 49/557* (2013.01); *H04B 7/00* (2013.01); *H04L 1/06* (2013.01); *H04L 12/6418* (2013.01);
(Continued)

(58) Field of Classification Search
CPC .............. H04L 27/2656; H04L 49/557; H04L 12/6418; H04L 1/06; H04L 69/22;
(Continued)

(56) References Cited

U.S. PATENT DOCUMENTS 5,909,564 A 6/1999 Alexander et al.
6,570,890 B1 5/2003 Keenan et al.
(Continued)

FOREIGN PATENT DOCUMENTS

WO 02065677 8/2002
WO 2004008703 1/2004
WO 2012054553 4/2012

OTHER PUBLICATIONS

International Patent Application No. PCT/US2015/015686, International Search Report and Written Opinion, dated May 27, 2015, 16 pages.

(Continued)

*Primary Examiner* — Kwang B Yao
*Assistant Examiner* — Moo Ryong Jeong
(74) *Attorney, Agent, or Firm* — Fogg & Powers LLC

(57) ABSTRACT

Certain features relate to improving the link-fault tolerance in a distributed antenna system (DAS) by utilizing a series of synchronous Ethernet frames. A receiving remote unit or a head-end unit in the DAS can predict the start of incoming Ethernet frames based on frame information extracted from previously received Ethernet frames. For example, a remote unit can be configured to receive one or more Ethernet frames, each of the one or more Ethernet frames including a start-of-frame field. After a period of time corresponding to the frame repetition rate, the remote unit can search for an additional start-of-frame field, indicating the receipt of the next Ethernet frame. The remote unit can extract the payload data from the next Ethernet frame based on the predicted value for the additional start-of-frame field.

20 Claims, 5 Drawing Sheets

(51) Int. Cl.
*H04L 12/64* (2006.01)
*H04B 7/00* (2006.01)
*H04W 24/04* (2009.01)
*H04L 1/06* (2006.01)
*H04L 29/06* (2006.01)
*H04L 12/70* (2013.01)

(52) U.S. Cl.
CPC ........ *H04L 27/2656* (2013.01); *H04L 49/552* (2013.01); *H04L 69/22* (2013.01); *H04W 24/04* (2013.01); *H04L 2012/5674* (2013.01)

(58) Field of Classification Search
CPC . H04L 49/552; H04L 2012/5674; H04B 7/00; H04W 24/04
See application file for complete search history.

(56) References Cited

U.S. PATENT DOCUMENTS

| | | |
|---|---|---|
| 6,697,366 B1 | 2/2004 | Kim |
| 2004/0196926 A1* | 10/2004 | Chien ................... H04L 7/042 375/316 |
| 2005/0070251 A1* | 3/2005 | Satake ................ H04L 12/1859 455/411 |
| 2005/0232307 A1 | 10/2005 | Andersson et al. |
| 2011/0243291 A1 | 10/2011 | McAllister et al. |
| 2012/0002558 A1 | 1/2012 | Swartzentruber et al. |
| 2013/0136202 A1 | 5/2013 | Kummetz et al. |

OTHER PUBLICATIONS

European Patent Office, "Extended European Search Report from EP Application No. 15786599.9 dated Nov. 29, 2017", "from Foreign Counterpart of U.S. Appl. No. 14/621,157", dated Nov. 29, 2017, pp. 1-14, Published in: EP.

Yoshimoto et al., "Next-Generation Access for Mobile Backhaul Application", "17th Opto-Electronics and Communications Conference (OECC) Technical Digest", Jul. 2012, pp. 709-710, Published in: Busan, Korea.

* cited by examiner

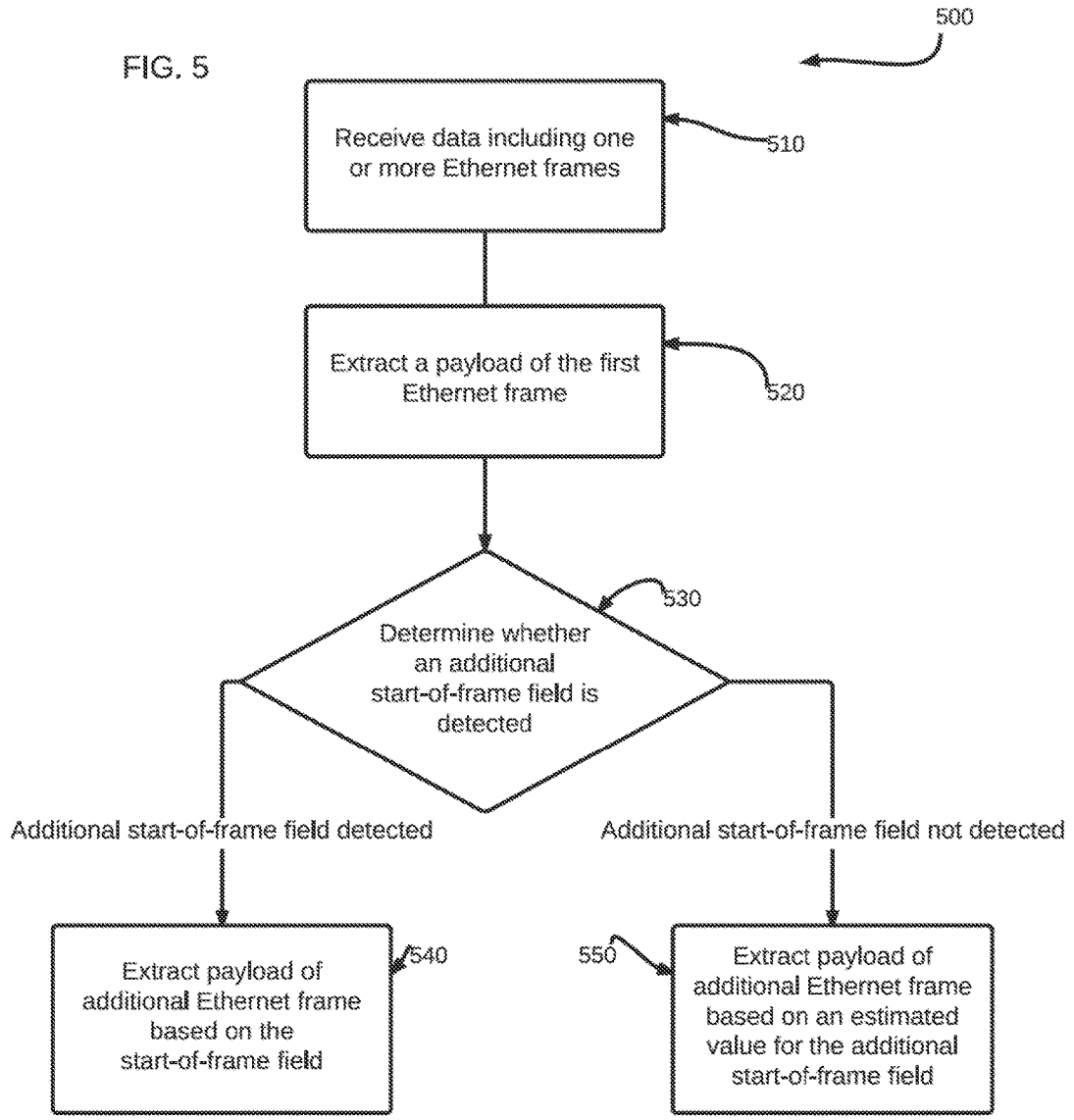

LINK-FAULT TOLERANCE IN A DISTRIBUTED ANTENNA SYSTEM

CROSS-REFERENCE TO RELATED APPLICATION

This claims priority to U.S. Provisional Application Ser. No. 61/987,869, filed May 2, 2014 and titled "Link-Fault Tolerance in a Distributed Antenna System." the contents of which are incorporated herein by reference.

BACKGROUND

A telecommunications system, such as a distributed antenna system (DAS), can include one or more head-end units and multiple remote units coupled to each head-end unit. A DAS can be used to extend wireless coverage in an area. Head-end units can be coupled to one or more base transceiver stations that can each manage wireless communications for different cell sites. A head-end unit can receive downlink signals from the base transceiver station and distribute downlink signals in analog or digital form to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the head-end unit. The head-end unit can transmit uplink signals to the serving base transceiver stations.

A head-end unit and a remote unit of a DAS can communicate using a digital link by an Ethernet link. In some environments, the link performance of an Ethernet link can be degraded due to a number of external factors. For example, in 10 GBASE-T Ethernet, external RF signals can induce errors in the Ethernet frames being transmitted between a head-end unit and a remote unit. The errors induced on the links can cause the Ethernet frame to contain errors. Errors in the received Ethernet frames can cause disruption in the transport channel and delays in data transmission.

SUMMARY

In one aspect, a method is provided. The method can include receiving, by a remote unit of a distributed antenna system, one or more Ethernet frames. Each of the one or more Ethernet frames include a start-of-frame field. The one or more Ethernet frames are associated with a frame repetition rate. The method can also include extracting a payload of a first Ethernet frame of the one or more Ethernet frames based on the start-of-frame field included in the first Ethernet frame. The method can also include predicting, after a period of time corresponding to the frame repetition rate, a value for an additional start-of-frame field included in an additional Ethernet frame. The method can also include extracting an additional payload from the additional Ethernet frame based on the value for the additional start-of-frame field.

In another aspect, a head-end unit of a distributed antenna system is provided. The head-end unit can include a processing device. The head-end unit can also include a non-transitory computer-readable medium having programmed code stored thereon. Upon execution by the processing device, the program code can perform the operation of extracting, from one or more Ethernet frames received by the head-end unit, a payload of a first Ethernet frame of the one or more Ethernet frames. The Ethernet frame includes a start-of-frame field, and the one or more Ethernet frames are associated with a frame repetition rate. The program code can also perform the operation of predicting, after a period of time corresponding to the frame repetition rate, a value for an additional start-of-frame field included in an additional Ethernet frame. The program code can further perform the operation of extracting an additional payload from the additional Ethernet frame based on the value for the additional start-of-frame field.

In another aspect, a distributed antenna system is provided. The distributed antenna system can include a head-end unit configured to transmit one or more Ethernet frames. Each of the one or more Ethernet frames include a start-of-frame field. The one or more Ethernet frames are also associated with a frame repetition rate. The distributed antenna system can also include a remote unit communicatively coupled to the head-end unit. The remote unit can be configured to receive a first Ethernet frame of the one or more Ethernet frames transmitted by the head-end unit. The remote unit can also be configured to extract a payload of the first Ethernet frame based on the start-of-frame field included in the first Ethernet frame. The remote unit can further be configured to predict, after a period of time corresponding to the frame repetition rate, a value for an additional start-of-frame field included in an additional Ethernet frame. The remote unit can further be configured to extract an additional payload from the additional Ethernet frame based on the value for the additional start-of-frame field.

BRIEF DESCRIPTION OF THE DRAWINGS

FIG. 5 is a flowchart depicting an example process for detecting Ethernet frames and extracting payload information according to one aspect of the present disclosure.

DETAILED DESCRIPTION

Certain aspects and features relate to increasing the tolerance for link errors that may be present in the radio frequency (RF) communication between a head-end unit and a remote unit of a distributed antenna system (DAS). Link-fault tolerance can be improved by utilizing a synchronous series of Ethernet frames, allowing a receiver remote unit or a head-end unit to predict the start of incoming Ethernet frames based on frame information extracted from previously received Ethernet frames. For example, head-end units and remote units in a DAS can transmit synchronous Ethernet frames, each frame configured to be the same length or the series of frames configured to follow a pattern of frame lengths and each frame transmitted at the same bit rate. The consistency of the frame length and the bit rate of the transmitted frames can allow a receiving head-end unit or remote unit to determine the start of each Ethernet frame, even if link errors are corrupting the Ethernet frame control fields that would normally indicate the start and end of the Ethernet frame.

Certain aspects described herein can allow a head-end unit and a remote unit in a DAS to maintain Ethernet link synchronization during periods of external RF interference, increasing the overall performance of the DAS and minimizing disruption for any user devices that are connected to the DAS. For example, maintaining synchronization by transmitting Ethernet frames with a consistent length and bit rate can allow a head-end unit or a remote unit to determine the start of each incoming Ethernet frame, even when bit errors are present rendering the Ethernet frame control information unreadable. The head-end unit or remote unit can then extract payload data of the Ethernet frame without requesting re-transmission of the Ethernet frame.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
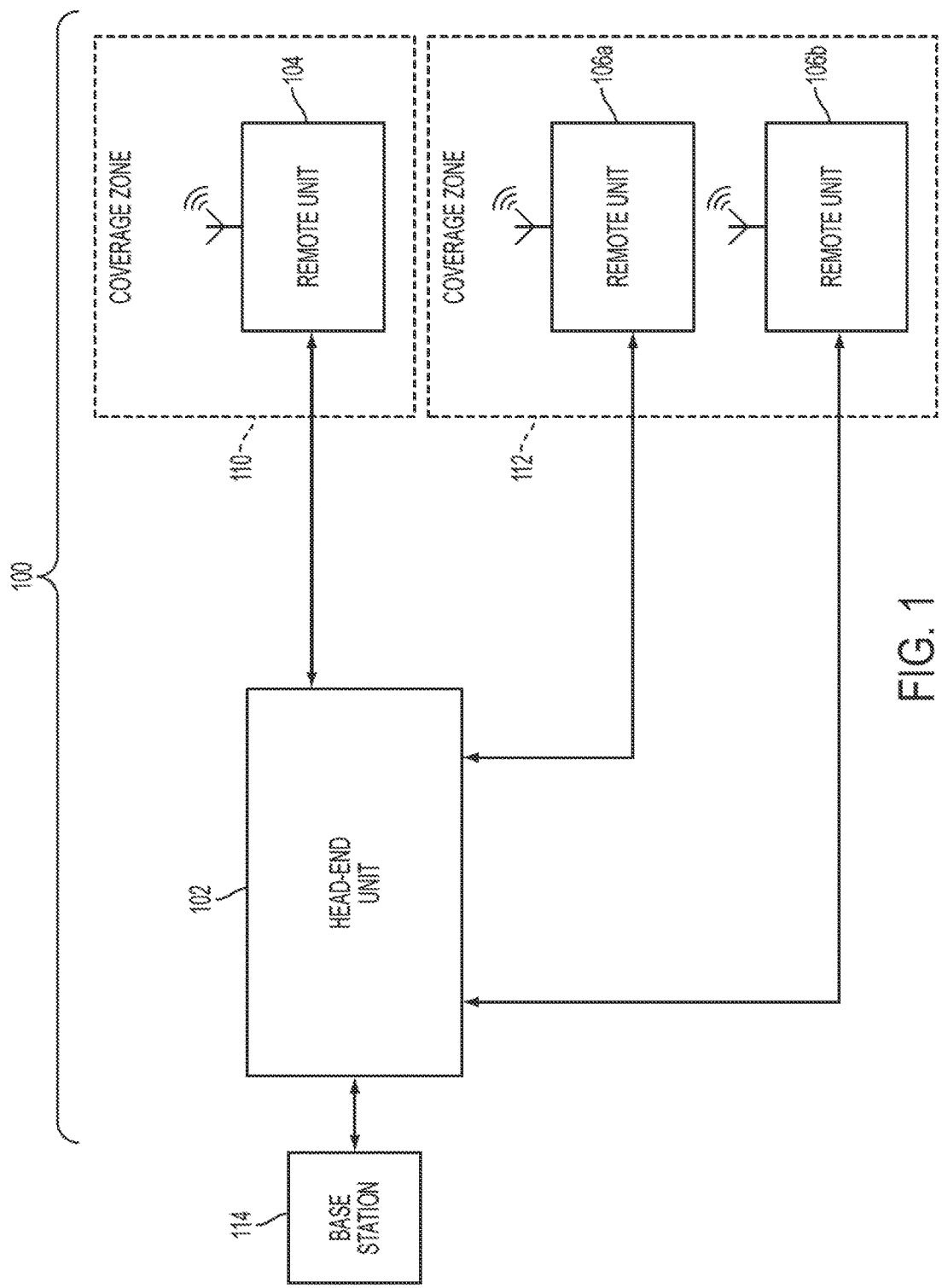
FIG. 1 is a block diagram of an example of a distributed antenna system (DAS) with a head-end unit and a network of remote units according to one aspect of the present disclosure.

FIG. 1 is a block diagram depicting an example of a DAS 100 that is designed to transport wireless communication between a base station 114 and user devices positioned in coverage zones 110, 112. The DAS 100 can include a network of spatially separated remote units 104, 106a-b communicatively coupled to a head-end unit 102. The head-end unit 102 can provide communication among the base station 114 and the remote units 104, 106a-b. The remote units 104, 106a-b can provide signal coverage to user equipment devices located in respective coverage zones 110, 112.

For illustrative purposes, FIG. 1 depicts a DAS 100 that communicates with one base station 114 and that includes a single head-end unit 102 and three remote units 104, 106a-b serving two coverage zones 110 and 112. A DAS according to various aspects and features can communicate with any number of base stations and can include any suitable number of head-end units and remote units. A DAS can also serve any number of coverage zones.

The head-end unit 102 can receive downlink signals from a base station 114 and transmit uplink signals to the base station 114. Any suitable communication link can be used for communication between the base station 114 and the head-end unit 102. For example, a direct connection or a wireless connection can be used for communication between the base station 114 and the head-end unit 102. A direct connection can include, for example, a connection via a copper, optical fiber, or other suitable communication medium. In some aspects, the head-end unit 102 can include an external repeater or internal RF transceiver to communicate with the base station 114. In some aspects, the head-end unit 102 can combine downlink signals received from different base station 114. The head-end unit 102 can transmit the combined downlink signals to one or more of the remote units 104, 106a-b.

The remote units 104, 106a-b can provide signal coverage in coverage zones 110 and 112 by transmitting downlink signals to user equipment devices and receiving uplink signals from the user equipment devices. The remote units 104, 106a-b can transmit uplink signals to the head-end unit 102. The head-end unit 102 can combine uplink signals received from the remote units 104, 106a-b for transmission to the base station 114.

The remote units 104, 106a-b can be communicatively coupled to the head-end unit 102 via any suitable digital communication link. For example, a digital communication link can include a 10 GBASE-T Ethernet link. In some aspects, the Ethernet link can include a direct connection such as copper cabling, optical fiber, or coaxial cable. In additional aspects, the Ethernet link can include a wireless connection. In one aspect, the head-end unit 102 can provide downlink data including a sequence of Ethernet frames to remote units 104, 106a-b. Similarly, remote units 104, 106a-b can transmit a sequence of Ethernet frames to the head-end unit 102. Each Ethernet frame can be the same length as the other Ethernet frames in the sequence (e.g., each Ethernet frame carries the same number of bits as the other Ethernet frames). In other aspects, the sequence of Ethernet frames can follow a repetitive pattern of frame lengths.

In some aspects, the data bits in each Ethernet frame transmitted by the head-end unit 102 and the remote units 104, 106a-b can be divided into control fields and payload fields. Control fields can include information pertaining to, for example, the start of frame identification, source identification, and destination identification. Payload fields can include the downlink wireless communication information intended for user devices in coverage zones 110, 112 or the uplink wireless communication information intended for the base station 114.

Figure 2:
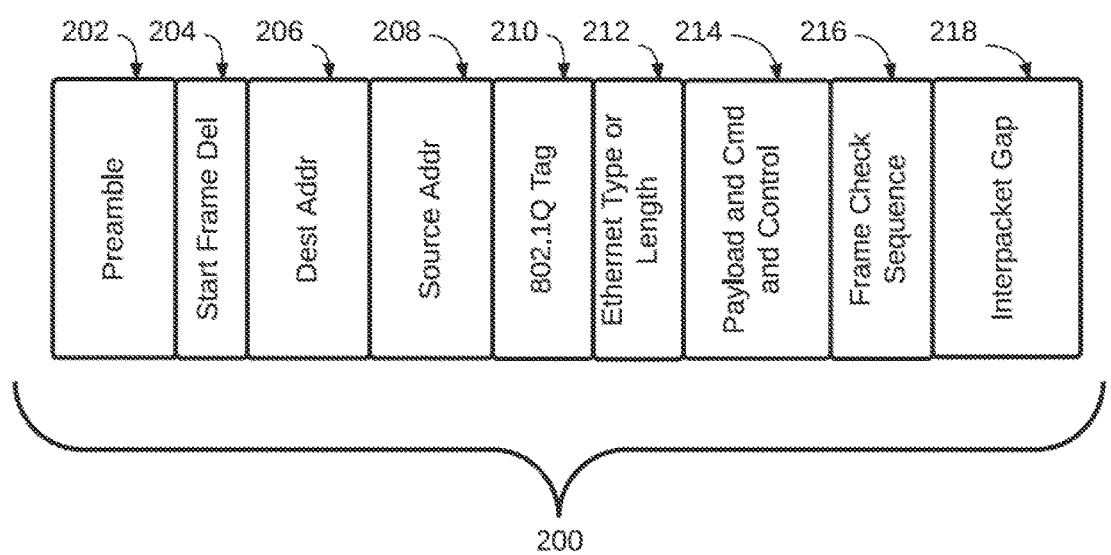
FIG. 2 is an example of an Ethernet frame that can carry control and payload information between the head-end unit and remote units of FIG. 1 according to one aspect of the present disclosure.

FIG. 2 depicts an example of an Ethernet frame 200 that can be used for transporting wireless communication information in the DAS 100. The Ethernet frame 200 can be divided into control fields such as a preamble field 202, a start-of-frame field 204, destination address field 206, source address field 208, 802.1Q tag field 210, Ethernet type or length field 212, frame check field 216, and interpacket gap field 218. The start-of-frame field 204 can include a bit pattern that can indicate to the receiving head-end unit 102 or remote unit 104 the start of the Ethernet frame 200. The Ethernet frame can also include a payload field 214 with digitized data pertaining to wireless communication information. For example, the payload field 214 can encapsulate the digitized representation of the communication channels used in the DAS 100.

Figure 3:
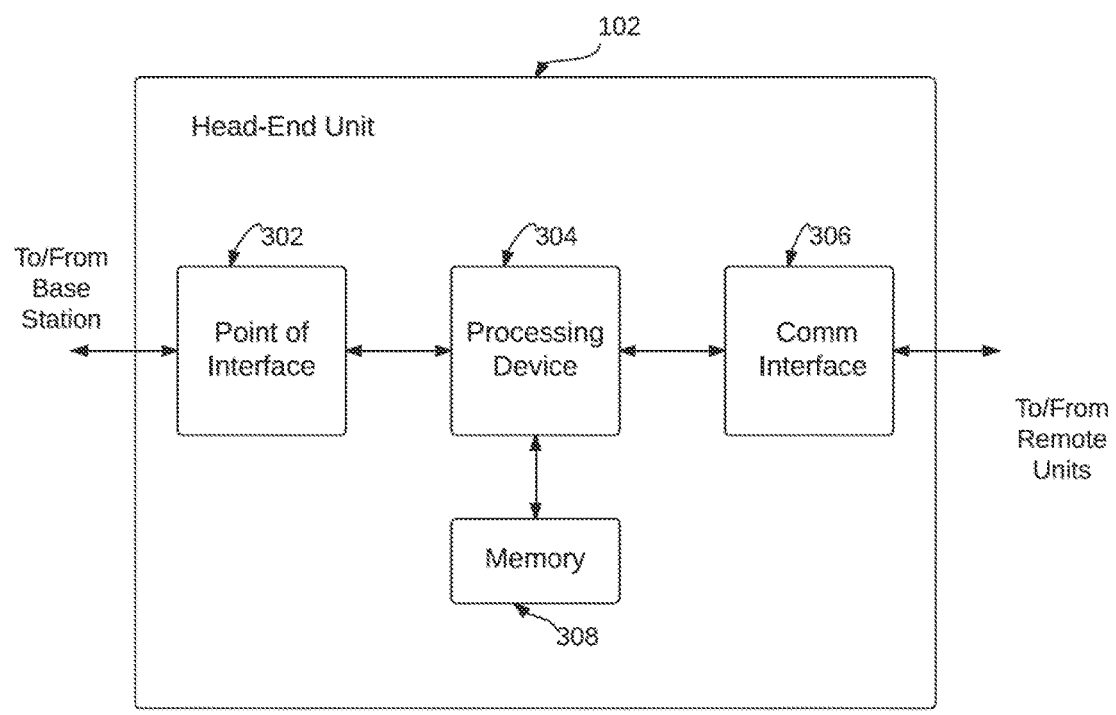
FIG. 3 is a block diagram depicting an example of a head-end unit according to one aspect of the present disclosure.
Figure 4:
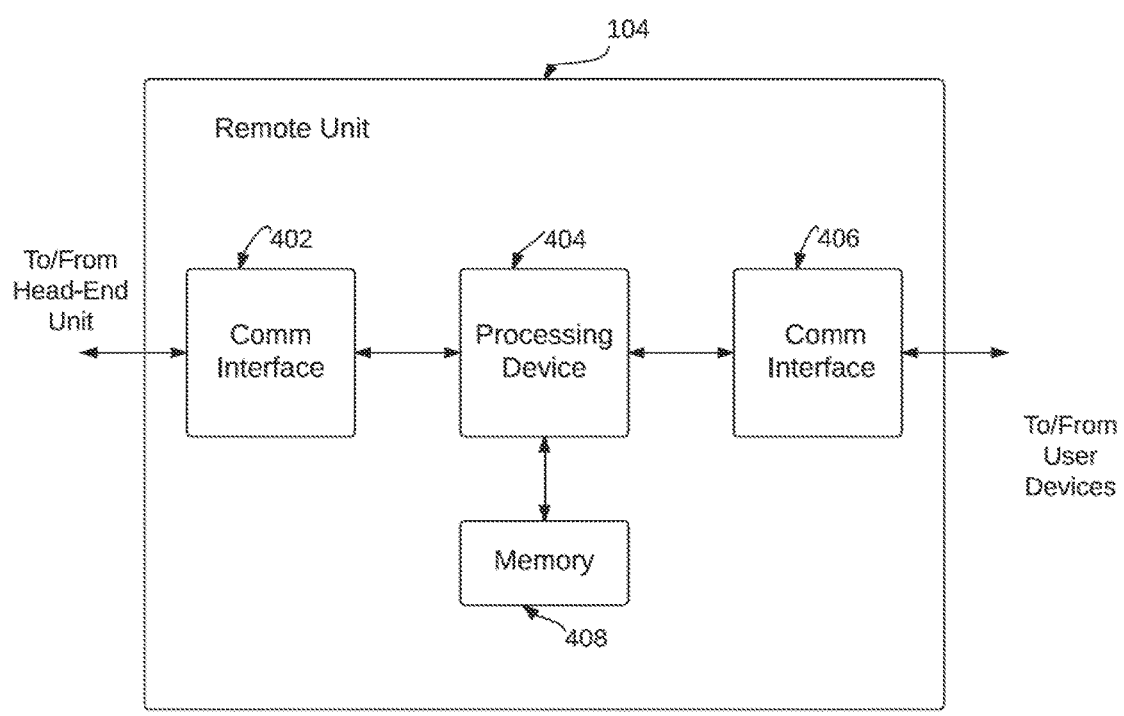
FIG. 4 is a block diagram depicting an example of a remote unit according to one aspect of the present disclosure.

The bit length of an Ethernet frame 200 can vary depending on which control fields are used and the amount of data included in the payload field 214. In some aspects, each Ethernet frame 200 in a sequence of Ethernet frames can have the same bit length. A sequence of Ethernet frames can also follow a consistent pattern of bit lengths (e.g., a first set of Ethernet frames 200 including X number of bits and a second set of Ethernet frames in the sequence including Y number of bits). A head-end unit 102 can extract data from the control fields and payload fields of a received Ethernet frame 200 on an uplink signal. Similarly, a remote unit 104 can extract data from the control fields and payload fields of a received Ethernet frame 200 on a downlink signal. FIGS. 3 and 4 depict block diagrams of examples of a head-end unit 102 and a remote unit 104, respectively, that can receive and process Ethernet frames.

In FIG. 3, head-end unit 102 can include, for example, a point of interface 302 for interfacing with the base station 114 and a communications interface 306 for providing communications to remote units 104, 106a-b. The point of interface 302 can include any wired or wireless connection for communicating with the base station 114. The communications interface 306 can include circuitry for conveying data received from the base station 114 to an appropriate form for transmission to remote units 104, 106a-b. For example, the communications interface 306 can include RF circuitry for converting digital data received from the base station 114 and processed by the processing device 304 to an analog RF signal for transmission to remote units 104, 106a-b. In other aspects, communications interface 306 can include a physical layer module, such as an Ethernet transceiver for transmitting and receiving sequences of Ethernet frames. The head-end unit can communicate Ethernet frames, such as Ethernet frame 200 to and from remote unit 104 via the communications interface 306. The head-end unit 102 can also include a processing device 304, which can include any suitable device for providing processing capabilities. Examples of the processing device 304 can include a field programmable gate array (FPGA), application specific integrated circuit (ASIC), or digital signal processor (DSP). The head-end unit 102 can further include a memory device 308 coupled to the processing device 304. The memory device 308 can include any non-transitory media for storing program code defining the operations of the head-end unit 102. Non-limiting examples of memory device 308 can include read-only memory (ROM), random-access memory (RAM), optical storage, magnetic storage, flash memory, or any other medium from which the processing device 304 can read program code.

FIG. 4 depicts a block diagram showing an example of a remote unit 104, which can include components similar to head-end unit 102. For example, remote unit 104 can include a processing device 404, communications interfaces 402, 406, and a memory device 408. Processing device 404, communications interfaces 402, 406, and memory device 408 can function similar to the components discussed with regards to FIG. 3. The remote unit 104 can communicate with user devices in coverage zone 110 via communications interface 406. The remote unit 104 can communicate with head-end unit 102 via the communications interface 402. For example, communications interface 402 can include circuitry for conveying data received from any user devices to an appropriate form for transmission to the head-end unit 102. For example, the communications interface 402 can include RF circuitry as described above. In other aspects, communications interface 402 can include a physical layer module, such as an Ethernet transceiver for transmitting and receiving sequences of Ethernet frames. The remote unit 104 can communicate Ethernet frames, such as Ethernet frame 200, to and from the head-end unit 102 via the communications interface 402.

Head-end unit 102 can provide a downlink signal including a sequence of synchronous Ethernet frames to remote unit 104. Similarly, remote unit 104 can provide an uplink signal including a sequence of synchronous Ethernet frames to head-end unit 102. In aspects described herein, head-end unit 102 and remote unit 104 can use the frame information in the start-of-frame field 204 from a first received frame to determine the start of additional incoming Ethernet frames, allowing head-end unit 102 and remote unit 104 to extract payload information from the additional incoming Ethernet frames. FIG. 5 is a flowchart depicting an example of a process 500 for extracting payload data using synchronous Ethernet frames in a DAS.

A head-end unit 102 or a remote unit 104 can receive data including one or more Ethernet frames 200, as shown in block 510. Each Ethernet frame 200 can be divided into control fields and payload fields. For example, a first Ethernet frame 200 in the sequence of Ethernet frames can include a start-of-frame field 204 and an Ethernet type or length field 212 carrying frame identifier information. The first Ethernet frame 200 an also include a payload field 214 carrying wireless communication information. The sequence of Ethernet frames can also be associated with a frame repetition rate. For example, when synchronous Ethernet is used, and each frame is configured to be the same length, the elements of the Ethernet frame structure occur at a periodic rate equal to the frame repetition rate. For example, if an Ethernet frame 200 is sent by a head-end unit 102 every X µs and sent at Y MBits/second, then the payload fields for each Ethernet frame 200 can occur every X µs and at every X*Y bits.

The head-end unit 102 or remote unit 104 can extract the payload information from the first received Ethernet frame 200 based on the start-of-frame field 204, as shown in block 520. The information extracted from the start-of-frame field 204 allows a head-end unit 102 and a remote unit 104 to determine the start position of the frame. As each Ethernet frame in the sequence of Ethernet frames has a fixed amount of overhead (e.g, fixed control fields), the payload field 214 in a synchronous stream of Ethernet frames can be located at the same position in each received Ethernet frame 200. Using the extracted information from the start-of-frame field 204, the head-end unit 102 or remote unit 104 can determine the location of the payload field 214. For example, an Ethernet frame 200 may include a start-of-frame field 204 that is one byte in length, a destination address field 206 that is six bytes in length, a source address field 208 that is six bytes in length, an 802.1Q tag field 210 that is four bytes in length, and an Ethernet type or length field 212 that is two bytes in length. In this example, each payload field 214 in a synchronous sequence of Ethernet frames can be detected within 19 bytes of the start of the start-of-frame-fields 204.

In block 530, the head-end unit 102 or remote unit 104 can determine, after a period of time corresponding to the frame repetition rate, whether an additional start-of-frame field 204 is detected. If the length of each Ethernet frame 200 in the sequence of Ethernet frames is the same, each of the one or more Ethernet frames in the sequence of Ethernet frames can be transmitted at the same rate (e.g., every X µs as indicated above). In a synchronous stream of Ethernet frames, the start-of-frame field 204 for each Ethernet frame can occur at the same periodic rate. The receiving head-end unit 102 or remote unit 104 can scan for the additional start-of-frame field 204 after the expected amount of time has passed from the receipt of the last start-of-frame field 204 (e.g., X µs). In some aspects, a counter can be started in the receiving head-end unit 102 or remote unit 104, the counter counting down with a period equal to the frame repetition rate. After a period of time corresponding to the frame repetition rate (e.g., conclusion of the counter), the head-end unit 102 or remote unit 104 can scan incoming data signals for an identifier that can correspond to a start-of-frame field 204 for an Ethernet frame 200.

If the sequence of Ethernet frames follows a repeating pattern of Ethernet frame lengths, the receiving head-end unit 102 or remote unit 104 can determine the additional start-of-frame field 204 based on the pattern. The receiver can determine the pattern of frame lengths in multiple ways. For example, in some aspects, the length of an Ethernet frame 200 can be encoded in the Ethernet type or length field 212. The head-end unit 102 or remote unit 104 can also determine the length of the Ethernet frame 200 by calculating the amount of bits between the first received start-of-frame field 204 and the end of the Ethernet frame 200. The lengths of sets of Ethernet frames can also be fixed and known by the receiving head-end unit 102 or remote unit 104. For example, the receiver can determine that the sequence of Ethernet frames includes two Ethernet frames of bit length X followed by two Ethernet frames of bit length Y. By determining the pattern of frame lengths for the sequence of Ethernet frames, the head-end unit 102 or remote unit 104 can scan incoming data signals for the additional start-of-frame field 204 after the expected amount of bits are received.

An additional start-of-frame field 204 can indicate the start of an additional Ethernet frame 200 from the sequence of Ethernet frames. In block 540, in response to detecting the additional start-of-frame field, the head-end unit 102 or the remote unit 104 can extract data from the payload field 214 from the additional Ethernet frame 200 as described above with respect to block 520. After extracting the payload data from the additional Ethernet frame 200, the process can repeat and the head-end unit 102 or remote unit 104 can determine whether a third start-of-frame field 204 is detected, corresponding to the next Ethernet frame 200 in the sequence of Ethernet frames.

In some aspects, bit errors can be present in the frame structure, resulting in the receiver in the head-end unit 102 or remote unit 104 not being able to detect an additional start-of-frame field 204 in the sequence of Ethernet frames. In block 550, if the additional start-of-frame field 204 is not detected, the head-end unit 102 or remote unit 104 can predict the value for the additional start-of-frame field 204. The location of the additional start-of-frame field 204 for the next incoming Ethernet frame 200 can be predicted based on the information extracted from the previously detected start-of-frame field 204. As mentioned above, in the sequence of Ethernet frames, each start-of-frame field 204 for each Ethernet frame 200 can occur at a pre-determined periodic rate, allowing the head-end unit 102 or remote unit 104 to predict the start of each Ethernet frame 200. The receiver can predict the additional start-of-frame field 204 by determining that the period of time corresponding to the frame repetition rate has passed. For example, if the head-end unit 102 or the remote unit 104 previously received a start-of-frame field 200 at 2 μs and each Ethernet frame is transmitted at a periodic rate of 4 μs, then the head-end unit 102 or the remote unit 104 can predict that an additional start-of-frame field 204 for the next Ethernet frame 200 can occur at 6 μs.

Based on the predicted additional start-of-frame field 204, the head-end unit 102 or remote unit 104 can extract the payload data of the next Ethernet frame 200 as described above with respect to block 520. For example, following the example discussed with respect to block 520, the receiver can find the payload field 214 of the next Ethernet frame 200 at 19 bytes after the additional start-of-frame field 204.

In some aspects, the head-end unit 102 or remote unit 104 can maintain a frame error counter. For example, a frame error counter can be maintained in the memory device 308 of the head-end unit 102 or in the memory device 408 of the remote unit 104. When the first start-of-frame field 204 is detected, the processing device 304 or the processing device 404 can set the value of the frame error counter to zero. After extracting payload information from the first received Ethernet frame 200, if the next start-of-frame field 204 is not detected, then the processing device 304 or processing device 404 can increment the frame error counter. This process can repeat for every successive Ethernet frame 200 until the frame error counter exceeds a programmable threshold. The programmable threshold can indicate that the start-of-frame field 204 has not been detected in the expected location for the threshold amount of successive frames. For example, if the frame error counter reaches a programmable threshold value of five, then the frame error counter can indicate that the start-of-frame field 204 has not been detected for five successive frames. In response to the frame error counter exceeding the programmable threshold, the head-end unit 102 or remote unit 104 can search the received data for the start-of-frame bit pattern. For example, the head-end unit 102 or remote unit 104 can analyze the bit stream of the incoming data to determine if another start-of-frame field 204 can be detected. If detected, the frame error counter can be set to zero and the process 500 can start again. A frame error counter can thus be used to re-synchronize the communication link between a head-end unit 102 and a remote unit 104. In other aspects, re-synchronization of the communication link can be based on the percentage of missed start-of-frame fields.

In some aspects, the length of each Ethernet frame in the synchronous sequence of Ethernet frames may not be the same value. A receiving head-end unit 102 or remote unit 104 can determine the location of a start-of-frame field 204 based on a pattern found in previously received Ethernet frames. For example, the Ethernet frames in a sequence of Ethernet frames can include a repetitive pattern of frame lengths. Based on the repetitive pattern of frame lengths, the processing device 304 in head-end unit 102 or processing device 404 in remote unit 104 can predict the position of additional start-of-frame fields. In other aspects, other frame fields can be used to determine the Ethernet frame structure and used to test if synchronization is valid. For example, the preamble field 202, source address field 208, or destination address field 206 can be used to predict the position of additional Ethernet frames in a sequence of Ethernet frames In additional aspects, a head-end unit 102 or remote unit 104 in a DAS 100 can modify training sequences of Ethernet signals to mitigate interference. For example, the 10 GBASE-T Ethernet PHY can perform a training of an Ethernet link when interference or poor performance is detected on the link. The transmitting PHY can send a known sequence of 802.3 control characters. The training sequence can last approximately 1-100 milliseconds in duration. The duration of the training can be PHY dependent. The training sequence can be used to mitigate interference by allowing a receiver to adapt equalizer coefficients in the receiving PHY device or to place notch filters in the receiver to remote the interference.

The receiving head-end unit 102 or remote unit 104 can detect the occurrence of the link training and insert zeroes into the frames whenever the training control words are detected. Inserting zeroes into the stream can effectively mute the DAS 100. In other aspects, instead of a zero sequence, a pseudo-random sequence can be inserted to replicate noise during a training event.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method, comprising:
receiving, by a remote unit of a distributed antenna system, one or more Ethernet frames, each of the one or more Ethernet frames including a start-of-frame field, the one or more Ethernet frames associated with a frame repetition rate;
detecting the start-of-frame field included in a first Ethernet frame of the one or more Ethernet frames;
extracting a payload of a first Ethernet frame of the one or more Ethernet frames based on the detected start-of-frame field included in the first Ethernet frame;
determining, after a period of time corresponding to the frame repetition rate, whether an additional start-of-frame field included in an additional Ethernet frame of the one or more Ethernet frames is detected;
in response to determining that the additional start-of-frame field is not detected, predicting a location of the additional start-of-frame field included in the additional Ethernet frame of the one or more Ethernet frames; and
extracting an additional payload from the additional Ethernet frame based on the predicted location of the additional start-of-frame field.

2. The method of claim 1, wherein the predicted location of the additional start-of-frame field is determined based on the start-of-frame field and the frame repetition rate.

3. The method of claim 1, wherein the payload of the first Ethernet frame and the additional payload of the additional Ethernet frame include wireless communication information, and wherein the remote unit is configured to transmit the wireless communication information within a coverage area.

4. The method of claim 1, further comprising:
determining whether the remote unit detected the additional start-of-frame field;
setting a frame error counter to zero in response to determining that the remote unit detected the additional start-of-frame field; and
incrementing the frame error counter in response to determining that the remote unit did not detect the additional start-of-frame field.

5. The method of claim 4, further comprising:
determining whether the frame error counter exceeds a threshold value;
searching for the additional start-of-frame field by analyzing the one or more Ethernet frames in response to the frame error counter exceeding the threshold value.

6. The method of claim 1, wherein predicting the location of the additional start-of-frame field includes determining an expected amount of time has passed corresponding to the frame repetition rate.

7. The method of claim 1, wherein the payload and the additional payload include digitized analog signals provided by a head-end unit of the distributed antenna system.

8. A head-end unit of a distributed antenna system, comprising:
a processing device; and
a non-transitory computer-readable medium having program code stored thereon, wherein the program code is executable for performing operations comprising:
detecting a start-of-frame field of a first Ethernet frame of one or more Ethernet frames received by the head-end unit, the one or more Ethernet frames associated with a frame repetition rate;
extracting, a payload of the first Ethernet frame of the one or more Ethernet frames based on the detected start-of-frame field of the first Ethernet frame;
determining, after a period of time corresponding to the frame repetition rate, whether an additional start-of-frame field included in an additional Ethernet frame of the one or more Ethernet frames is detected;
in response to determining that the additional start-of-frame field is not detected, predicting a location of the additional start-of-frame field included in the additional Ethernet frame of the one or more Ethernet frames; and
extracting an additional payload from the additional Ethernet frame based on the predicted location of the additional start-of-frame field.

9. The head-end unit of claim 8, wherein the predicted location of the additional start-of-frame field is determined based on the frame repetition rate and the start-of-frame field.

10. The head-end unit of claim 8, wherein the payload of the first Ethernet frame and the additional payload of the additional Ethernet frame include wireless communication information from a remote unit in the distributed antenna system.

11. The head-end unit of claim 8, wherein the program code is further executable for performing operations comprising:
determining whether the head-end unit detected the additional start-of-frame field;
setting a frame error counter to zero in response to determining that the head-end unit detected the additional start-of-frame field; and
incrementing the frame error counter in response to determining that the head-end unit did not detect the additional start-of-frame field.

12. The head-end unit of claim 11, wherein the program code is further executable for performing operations comprising:
determining whether the frame error counter exceeds a threshold value;
searching for the additional start-of-frame field by analyzing the one or more Ethernet frames received by the head-end unit in response to the frame error counter exceeding the threshold value.

13. The head-end unit of claim 8, wherein predicting the location of the additional start-of-frame field includes determining an expected amount of time has passed corresponding to the frame repetition rate.

14. The head-end unit of claim 8, wherein the payload and the additional payload include digitized analog signals provided by a remote unit of the distributed antenna system.

15. A distributed antenna system, comprising:
a head-end unit configured to transmit one or more Ethernet frames, each of the one or more Ethernet frames including a start-of-frame field, the one or more Ethernet frames associated with a frame repetition rate; and
a remote unit communicatively coupled to the head-end unit, the remote unit configured to:
receive a first Ethernet frame of the one or more Ethernet frames transmitted by the head-end unit,
detect a start-of-frame field included in the first Ethernet frame,
extract a payload of the first Ethernet frame based on the detected start-of-frame field included in the first Ethernet frame,
determine, after a period of time corresponding to the frame repetition rate, whether an additional start-of-frame field included in an additional Ethernet frame of the one or more Ethernet frames is detected, in response to determining that the additional start-of-frame field is not detected, predict a location of the additional start-of-frame field included in the additional Ethernet frame of the one or more Ethernet frames, and extract an additional payload from the additional Ethernet frame based on the predicted location of the additional start-of-frame field.

16. The distributed antenna system of claim 15, wherein the predicted location of the additional start-of-frame field is determined based on the frame repetition rate and the start-of-frame field.

17. The distributed antenna system of claim 15, wherein the payload of the first Ethernet frame and the additional payload of the additional Ethernet frame include wireless communication information, and wherein the remote unit is configured to transmit the wireless communication information within a coverage area.

18. The distributed antenna system of claim 15, wherein the remote unit is further configured to:

determine whether the remote unit detected the additional start-of-frame field;

set a frame error counter to zero in response to determining that the remote unit detected the additional start-of-frame field, and increment the frame error counter in response to determining that the remote unit did not detect the additional start-of-frame field.

19. The distributed antenna system of claim 18, wherein the remote unit is further configured to:

determine whether the frame error counter exceeds a threshold value, and search for the additional start-of-frame field by analyzing the one or more Ethernet frames received by the remote unit in response to the frame error counter exceeding the threshold value.

20. The distributed antenna system of claim 15, wherein the remote unit is configured to predict the location of the additional start-of-frame field by determining an expected amount of time has passed corresponding to the frame repetition rate.

* * * * *